US008718479B2

(12) United States Patent
Andersson et al.

(10) Patent No.: US 8,718,479 B2
(45) Date of Patent: May 6, 2014

(54) FIBER OPTIC CABLE ASSEMBLY FOR OPTICAL TRANSCEIVER

(75) Inventors: Hans Magnus Emil Andersson, Jarfalla (SE); Asa Christina Johansson, Kungsangen (SE); John Krister Frode, Vallentuna (SE); Lars-Gote Svenson, Sollentuna (SE)

(73) Assignee: Tyco Electronics Services GmbH (CH)

( * ) Notice: Subject to any disclaimer, the term of this patent is extended or adjusted under 35 U.S.C. 154(b) by 817 days.

(21) Appl. No.: 12/030,338

(22) Filed: Feb. 13, 2008

(65) Prior Publication Data

US 2008/0199187 A1      Aug. 21, 2008

Related U.S. Application Data

(60) Provisional application No. 60/901,872, filed on Feb. 16, 2007.

(51) Int. Cl.
*H04B 10/00* (2013.01)
*H04B 10/12* (2011.01)

(52) U.S. Cl.
USPC ............................................ 398/138; 398/135

(58) Field of Classification Search
CPC ........ H04B 10/25; H04B 10/40; H04B 10/43; H04B 10/50; H04B 10/501
USPC ........ 398/140, 164, 135–139; 385/88, 89, 92, 385/93, 94
See application file for complete search history.

(56) References Cited

U.S. PATENT DOCUMENTS

| | | | | |
|---|---|---|---|---|
| 5,020,880 A * | 6/1991 | Bluege | ............................ | 359/894 |
| 6,130,979 A | 10/2000 | Ksaksson et al. | | |
| 6,910,812 B2 * | 6/2005 | Pommer et al. | .................. | 385/92 |
| 2002/0154362 A1 * | 10/2002 | Oki et al. | ........................ | 359/152 |
| 2002/0176459 A1 * | 11/2002 | Martinsen | ......................... | 372/34 |
| 2003/0151443 A1 * | 8/2003 | Kondo et al. | .................. | 327/307 |
| 2004/0105633 A1 * | 6/2004 | Ishikawa et al. | ................. | 385/92 |
| 2005/0036746 A1 * | 2/2005 | Scheibenreif et al. | ........... | 385/92 |
| 2005/0286838 A1 * | 12/2005 | Oki et al. | ......................... | 385/92 |
| 2006/0140551 A1 * | 6/2006 | Yu et al. | .......................... | 385/92 |
| 2006/0153506 A1 * | 7/2006 | Cheng et al. | .................... | 385/88 |
| 2006/0285806 A1 * | 12/2006 | Ahrens | ............................ | 385/92 |
| 2008/0044140 A1 * | 2/2008 | Wang et al. | ...................... | 385/88 |

* cited by examiner

*Primary Examiner* — Daniel Dobson
(74) *Attorney, Agent, or Firm* — Laubscher & Laubscher, PC

(57) ABSTRACT

Disclosed is an optical floating sub-assembly, comprising a thermally conductive non rigid substance between the heat sink carrier and external casing, to minimize mechanical stress on the optical assembly. Also disclosed is a printed circuit board as an electrical interface, comprising two modules capable of converting an electrical signal to an optical signal, transmitting the optical signal and then converting the optical signal back to an electrical signal. Also disclosed is an optical assembly, comprising a heat sink with mechanical features for optical alignment.

17 Claims, 8 Drawing Sheets

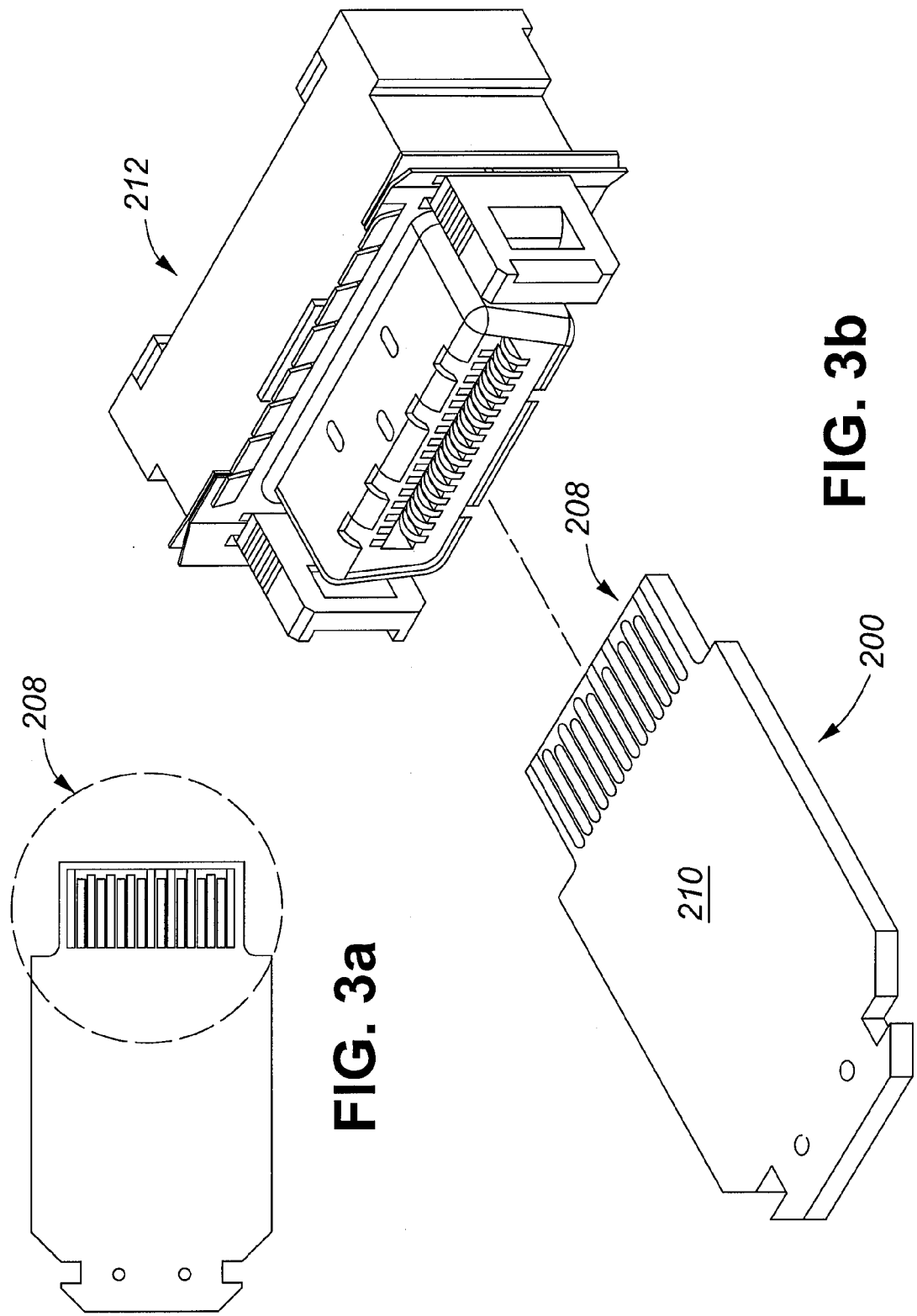

FIBER OPTIC CABLE ASSEMBLY FOR OPTICAL TRANSCEIVER

CROSS-REFERENCE TO RELATED APPLICATION

This application claims the benefit of U.S. Provisional Application No. 60/901,872 filed Feb. 16, 2007, incorporated by reference herein.

FIELD OF THE INVENTION

The present invention broadly relates to fiber optic transceiver.

BACKGROUND OF THE INVENTION

Various types of optical fiber cable assemblies have been developed since the inception of optical fiber communications systems. Many fiber optic products incorporate fiber pigtail interfaces between the optical device and the optical connector, collectively referred to as cable assemblies. These fiber pigtails are extremely fragile and must be handled carefully. However, optical systems are subject to mechanical stresses which can damage the systems. In particular, the interface between the fiber optic connector and cable is particularly sensitive to damage arising from the concentration of stress at the connector interface and the weight of the connector body. In certain instances these stresses may be sufficient to cause physical damage to the connector's components and the optical fibers contained therein. Such mechanical stress can distort optical paths and alignment. Damage and misalignment will ruin the fiber's ability to transmit light. And in many cases, can completely disrupt the system's performance.

Thus, it is desirable then to introduce very little mechanical stress on optical fiber end, which in turn promotes long-term life.

To this end, some optical systems use a combination of rigid printed circuit board (PCB) and flexible PCB. A disadvantage of a combination of rigid PCB and flexible PCB is that a rigid/flexible PCB is more expensive compared to rigid PCB only. The approximate cost ratio is 20:1. Further, a flexible PCB with thin track widths (100 μm and below) is difficult to process with guaranteed quality.

Another problem experienced by optical systems is the interconnection of the optical assembly to the PCB board itself. It is also known in the art to use a separate electrical contact (metal connector leads integrated in a non-electrically conductive material). A disadvantage with a separate electrical contact is extra cost for additional piece parts as well as additional solder joints having a negative impact on signal integrity performance.

It is also known in the art to use an external assembly of mechanical alignment features and/or active alignment of optical dies and/or lens system. Disadvantages with an active alignment procedure for optical die/lens system include: high precision alignment tooling and/or machinery needed and extra cost for additional piece parts.

Complicating things even more is the desire for increasing the number of fibers presented in a single optical connector. The industry is evolving from single fiber ferrules to multi-fiber ferrules containing two or more fibers.

SUMMARY OF THE INVENTION

A cable assembly for connecting an optical transceiver to a host board is provided. Embodiments of this invention provide solutions to mitigate the effect of errors induced on optical systems by various mechanical stresses.

One aspect of the invention addresses a way to isolate mechanical stress from the stress/displacement sensitive optical fiber interface.

Another aspect of the invention addresses a way to improve signal integrity in a high-spec electrically-connectorized transceiver module, by using the same core printed circuit board as the connector interface board.

Another aspect of the invention addresses a way to both heatsink and align a multiplicity of optical sources/detectors to a multiplicity of fibers.

Accordingly, in one aspect, the invention provides an optical device, comprising: a substrate interface board; an optical sub-assembly mounted to said substrate interface board; an electrical connector mounted to the substrate interface board, the electrical connector adapted to mate with a corresponding connector on a host board provide a connection with the host board; and an external carrier in which the substrate interface board, optical sub-assembly and electrical connector are mounted.

The optical device may comprise an interface board and heat sink, and/or a flexible joint between the heat sink and external carrier to absorb mechanical stress when the electrical connector mates with the connector on the host board. The flexible joint may comprise a thermally conductive non-rigid substance, such as Bondply.

The heat sink may comprise integrated mechanical features such that the optical sub-assembly is passively aligned to the substrate interface board. The integrated mechanical features may be guide pins.

The substrate interface board may be a printed circuit board. The device may be an optical transceiver. The host board may be part of a router.

The electrical connector mounted to the interface board may be a male electrical connector and the corresponding connector on the host board may be a female electrical connector. The interface board may comprise two modules capable of converting an electrical signal to an optical signal, transmitting the optical signal and then converting the optical signal back to an electrical signal.

In another aspect, the invention provides a printed circuit board having an optical floating sub-assembly, comprising a thermally conductive non rigid substance between a heat sink carrier and an external casing of the optical flowing sub-assembly, to minimize mechanical stress on the optical floating sub-assembly.

In another aspect, the invention provides a printed circuit board as an electrical interface, comprising two modules capable of converting an electrical signal to an optical signal, transmitting the optical signal and then converting the optical signal back to an electrical signal, whereby the printed circuit board acts as an electrical connector.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein:

FIG. 1b illustrates an optical floating sub-assembly on a printed circuit board from the optical device of FIG. 1a;

FIG. 1c is a side view of an assembled optical device from FIG. 1a;

FIG. 2b illustrates a heat sink with mechanical features used in the optical device of FIG. 2a;

FIG. 2c illustrates a partially assembled optical device of FIG. 2a;

FIG. 3a illustrates a top view of a printed circuit board as an electrical connector in accordance with the teachings of this invention;

FIG. 3b illustrates a perspective view of the printed circuit board of FIG. 3a with a corresponding mating connector prior to insertion;

FIG. 4 illustrates the heat sink of FIG. 2a; and

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE DISCLOSED EMBODIMENTS

Figure 1A:
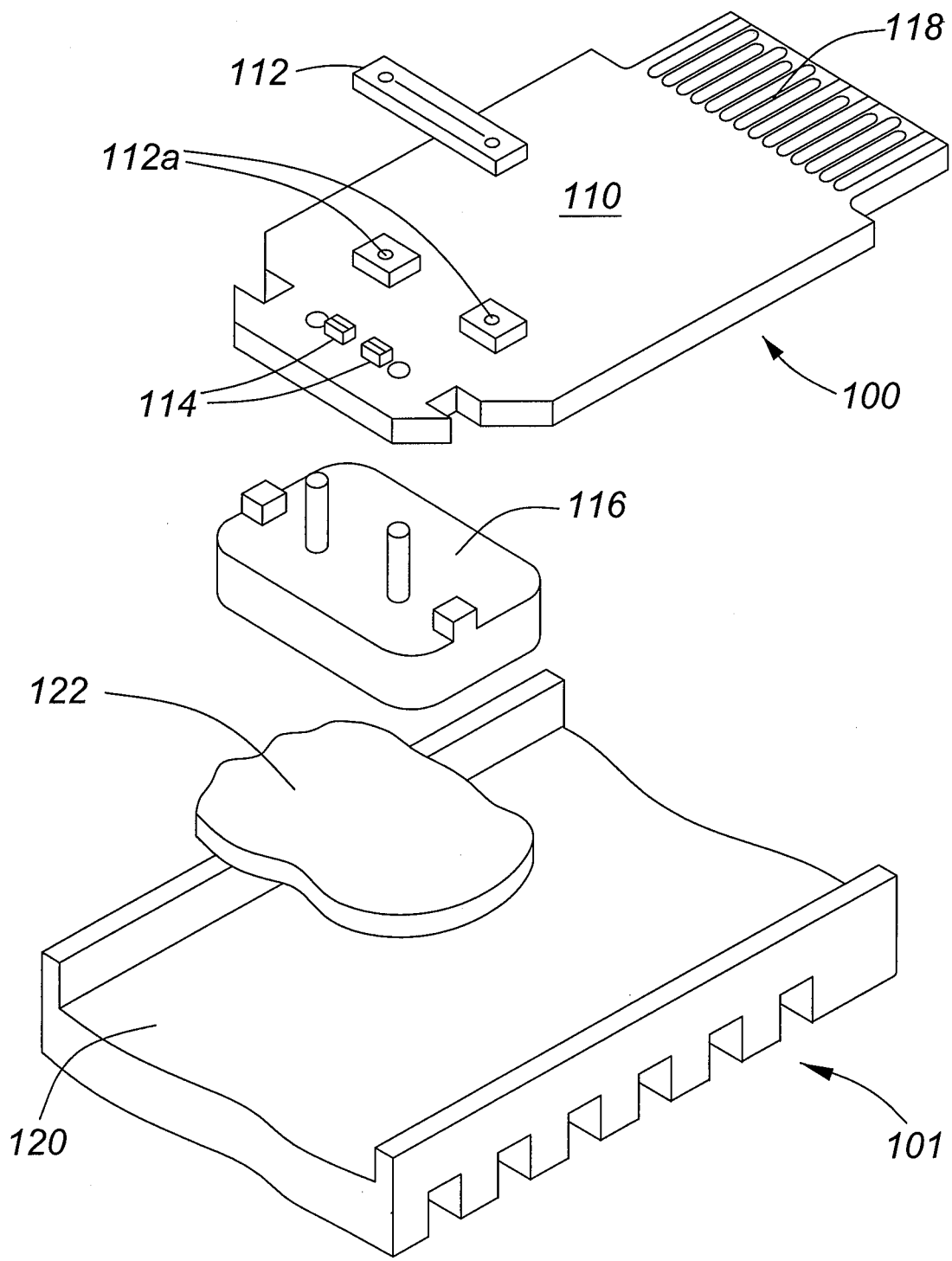
FIG. 1a is an exploded view of an optical device in accordance with the teachings of this invention.
Figure 1B:
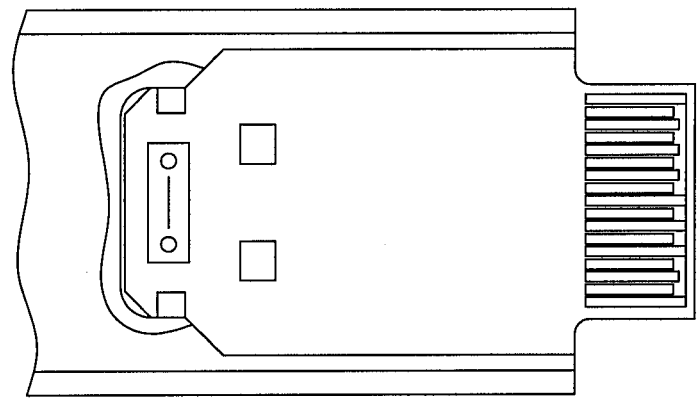
Figure 1C:
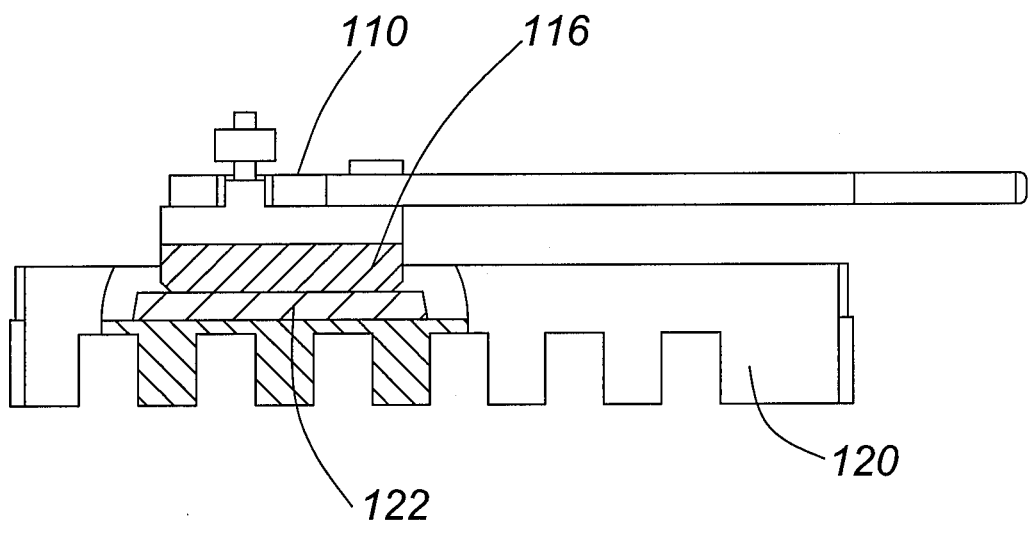

Referring to FIGS. 1a, 1b and 1c, there is provided optical device 101 in accordance with the teachings of this invention. The optics of the optical device are packaged in a unitary structure referred to herein as the optical sub-assembly 100, in which all optical alignments are contained. The optics may include, for example, lens 112, driver circuitry 112a, and optical die 114.

Figure 2A:
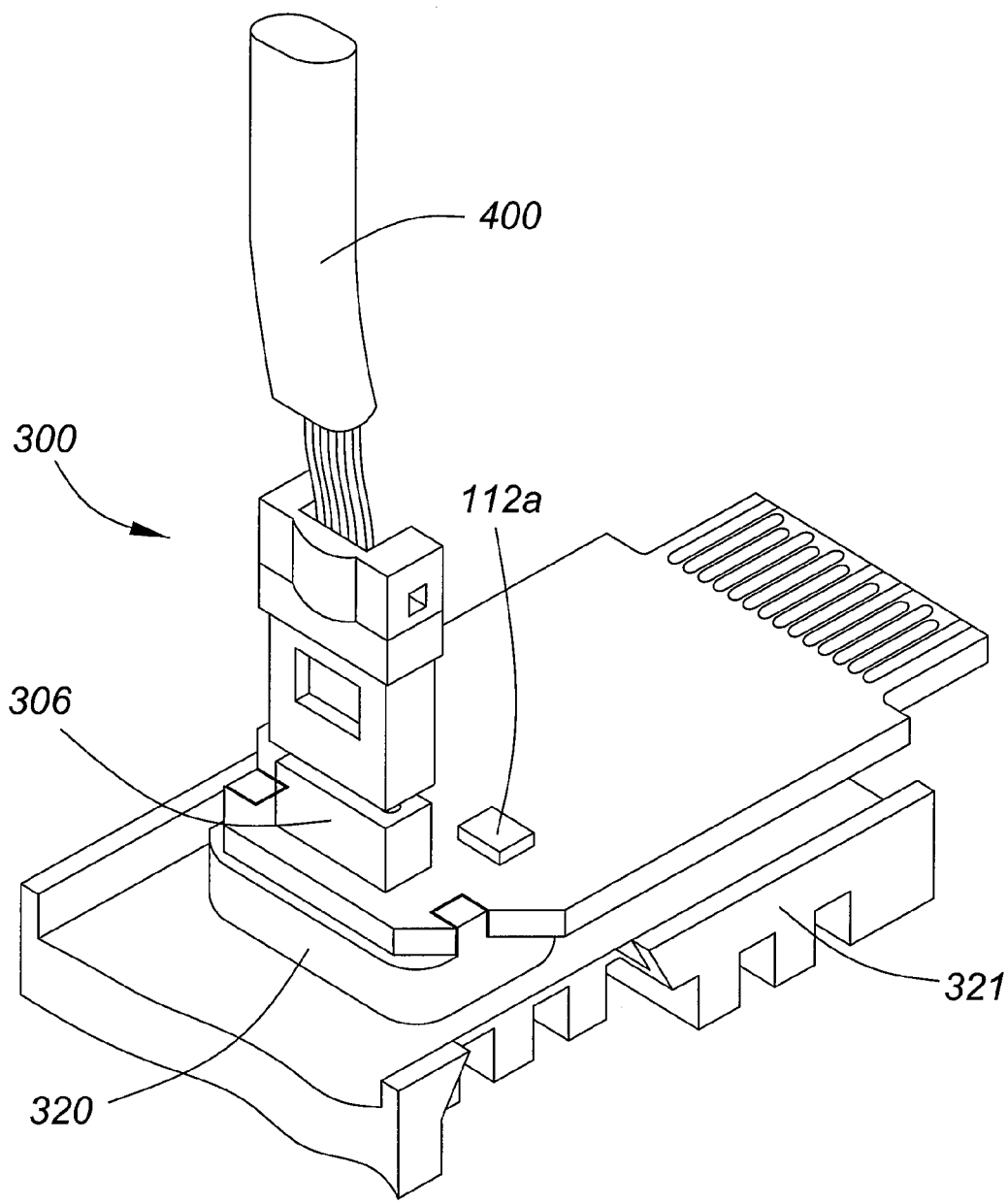
FIG. 2a is an assembled optical device comprising a heat sink with mechanical features for optical alignment in accordance with the teachings of this invention.
Figure 2B:
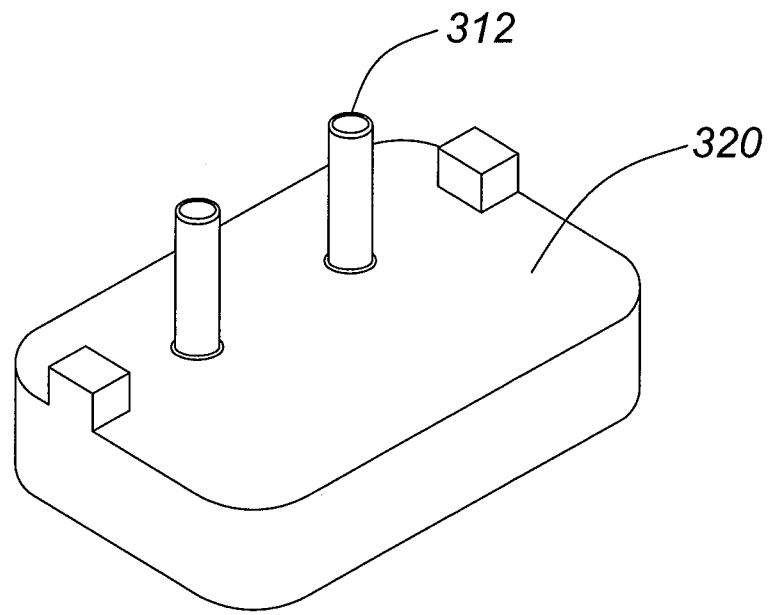
Figure 2C:
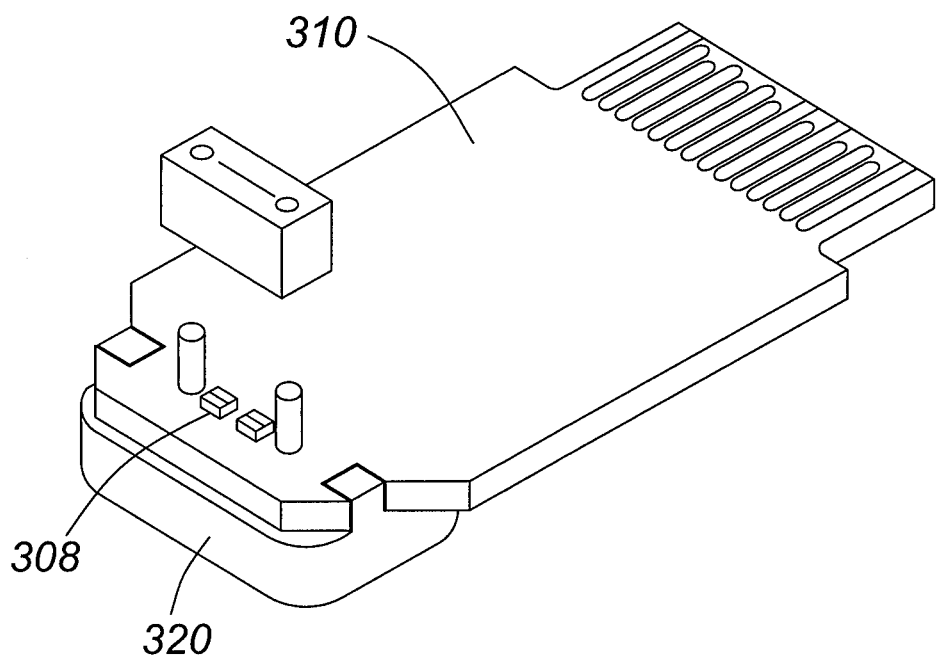

The optical sub-assembly 100 is placed on a printed circuit board (PCB) 110. The optics of the optical sub-assembly 100 may be passively aligned to the PCB 110 with use of mechanical features integrated in a heat sink carrier 116, as described in more detail below in conjunction with FIGS. 2a, 2b and 2c. The PCB 110 and mounted optical sub-assembly 100 are then mounted in an external carrier 120. The combination of the optical sub-assembly 100, PCB 110 and external carrier 120 collectively form optical device 101.

The PCB 110 may further include a male electrical connector 118 mounted thereon, this optional embodiment being further described below in conjunction with FIGS. 3a, 3b, 3c, 3d, 3e and 3f. A non-rigid substance 122 is provided on the PCB such as to create a flexible joint between the heat sink carrier 116 and an external casing 120. The flexible joint 122 is a thermally conductive non-rigid substance. The male electrical connector 118 and flexible joint 122 form the cable assembly for connecting the optical device 101 to a host system. In this way, optical sub-assembly 100 is considered to be "floating".

In use, the PCB 110 is connected to a customer host board (not shown in FIG. 1a, 1b or 1c). When the optical transceiver 110 is inserted in such a female connector, a mechanical force is applied to both PCB 110 and the optical floating sub-assembly 100.

By having flexible joint 122 between the heat sink carrier 116 and external casing 120, the heat generated by the optics, is transferred from the optical floating sub-assembly 100 to the heat sink carrier 116 to the external casing 120. In this way, the external casing 120 serves as a secondary heat sink.

The flexible joint 122 mechanically de-couples the PCB 110 and optical floating sub-assembly 100 from the host board such that forces applied for instance during the connection of a fiber cable do not stress or harm PCB 110 and optical floating sub-assembly 100. Thus, the flexible joint 122 minimizes mechanical stress, on the sensitive optical device 101 during insertion in and detachment from a female-electrical connector.

There are numerous possibilities of suitable materials for the flexible joint 122, as long a thermally transferable non-rigid joint is formed. One example is a material known as BondPly® by Berquist Company (see: www.bergquistcompany.com/objects/data_sheets/PDS_Bond_Ply_100_PDF-.pdf.) This material is applied like a tape and has an adhesive layer on booth sides of the tape. Another example is the Gap-pad material, also by Berquist Company (see: www-.bergquistcompany.com/tm_gap_pad_list.cfm).

The size of the flexible joint 122 is dependent on the substance's thermal conductivity. Applicant has found a 12×8 mm piece of BonPly to be one suitable example.

Referring to FIGS. 2a, 2b, 2c, and 4, there is illustrated an embodiment of a heat sink 320 with mechanical features 312 for optical alignment in accordance with the teachings of this invention. In other words, rather than relying on active alignment to achieve the desired degree of alignment, certain mechanical features can be used.

The optical sub-assembly 300 is placed on a heat sink carrier 320, where the optical system 300 (for example: lens 306, driver circuitry 112a and optical die 308) is passively aligned with use of mechanical features integrated in heat sink carrier 320 (also known as "sub Carrier"). Optical die 308 is accurately placed in reference to mechanical alignment feature 312. In the illustrated example, the mechanical feature includes guide pins 312. Lens system and optical light guide follow the same procedure and thereby aligning the optical output/input optical lens system and/or light guide. The PCB 310, mounted optical sub-assembly 300 and heat sink 320 are then mounted in an external carrier 321. The optical sub-assembly could be floating as is optical sub-assembly 100 if the system also incorporates flexible joint 122.

In this way, it is possible to passively align optical dies (LED, Photo detector, LASER etc.) to lens system and/or light guide (optical glass/polymer fiber). In the example illustrated, the system is aligned with light guide 400. In addition this, heat is dissipated from the optical dies/driver circuitry to be routed thru the carrier to external casing or such.

PCB 310 may further include a male electrical connector mounted thereon, this optional embodiment being further described below in conjunction with FIGS. 3a, 3b, 3c, 3d, 3e and 3f.

Figure 3C:
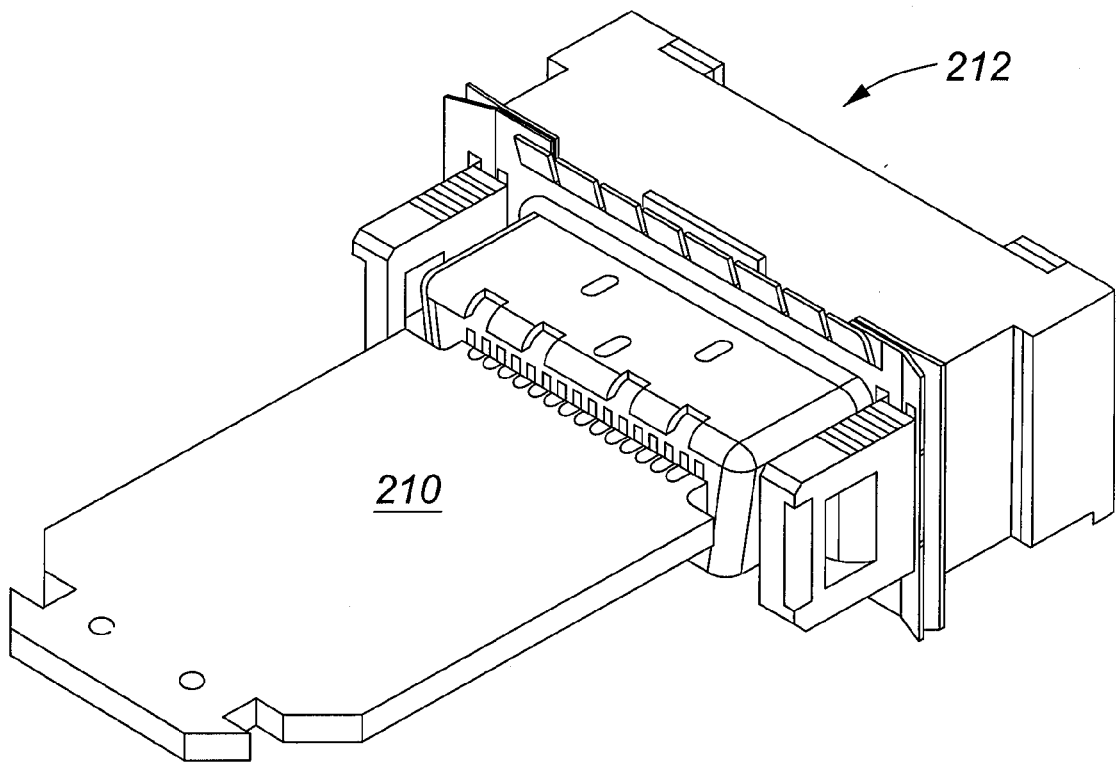
FIG. 3c illustrates the printed circuit board of FIG. 3a inserted in the corresponding mating connector of FIG. 3b.
Figure 3D:
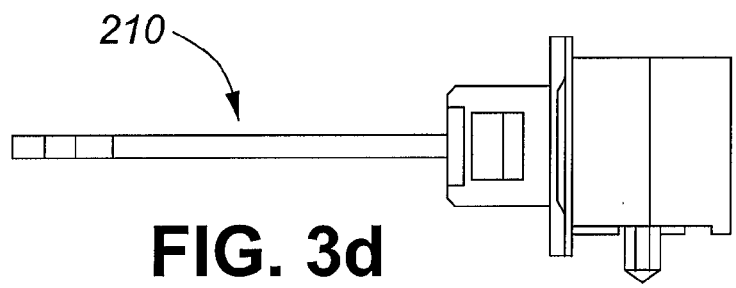
FIG. 3d is a side view of the inserted printed circuit board of FIG. 3c.
Figure 3E:
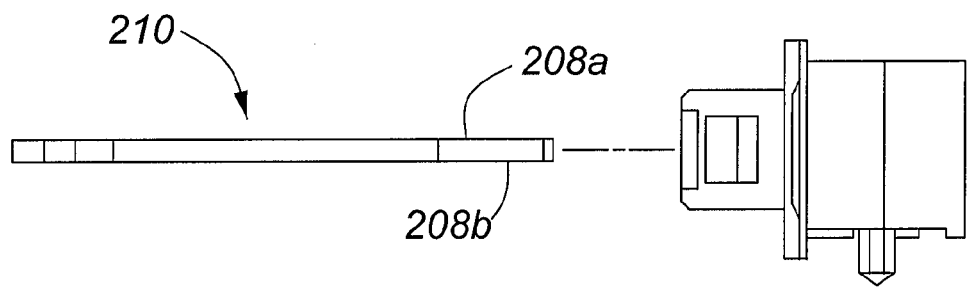
FIG. 3e is an exploded side view of FIG. 3b.
Figure 4:
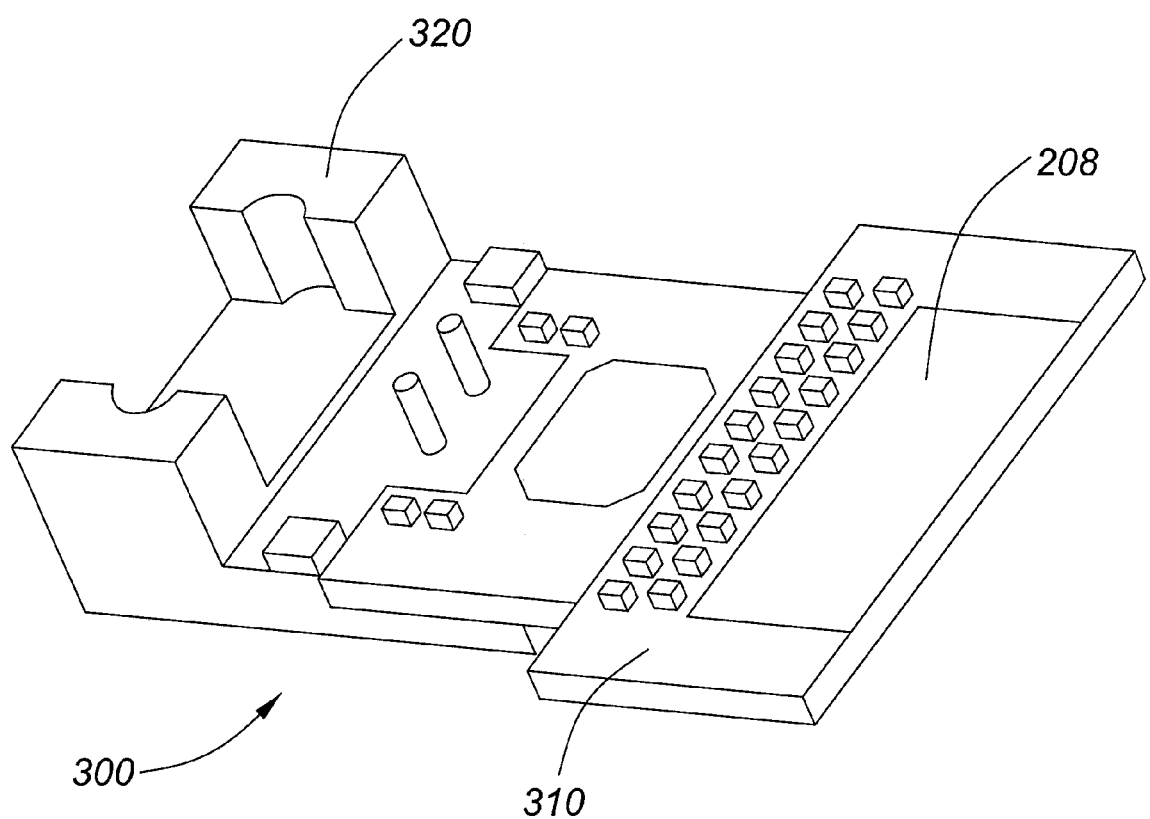
Figure 5:
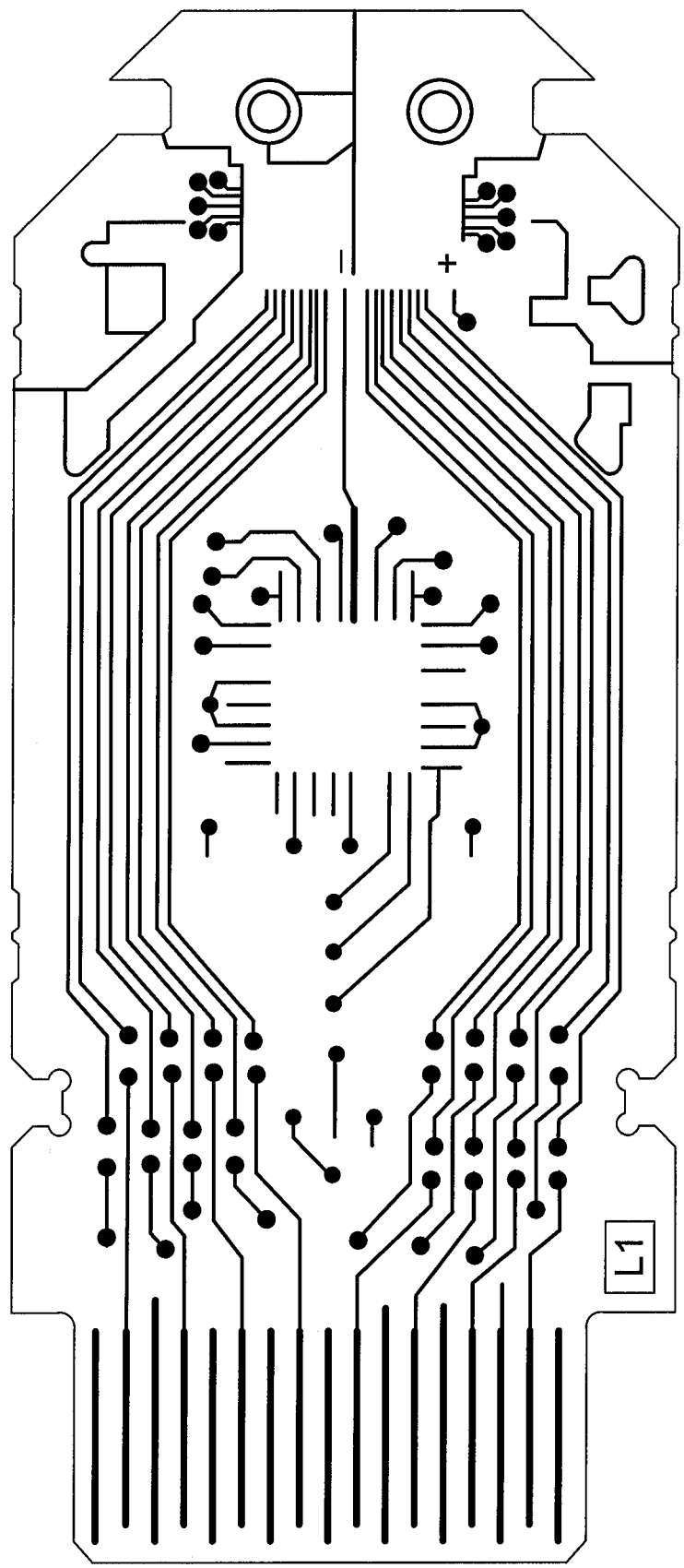
FIG. 5 is a detailed picture of a printed circuit board with an incorporated connector and leads in the rear section.

FIG. 4 illustrates heat sink carrier 320 or sub Carrier with mechanical alignment feature 312 used for passive alignment. FIG. 4 also illustrates an optional rear section that serves as a connector to a host system which is described in more detail in conjunction with FIGS. 3a, 3b, 3c, 3d, 3e and 3f.

Referring to FIGS. 3a, 3b, 3c, 3d, 3e, 3f, and 5 by providing a male electrical connector 208 right on PCB 210, it is possible to use PCB 210 as an electrical interface 200. Such an electrical interface may fit with a so called MicroGigaCN-connector (Fujitsu Trademark) for High Speed Multilane Optical Cable. This allows the use of PCB 210 as electrical interface for the High Speed Multiline Optical Cable. The High Speed Multilane Optical Cable consists of two modules capable of converting an electrical signal to an optical signal, transmitting the optical signal up to several hundred meters and then converting the optical signal back to an electrical signal exceeding 20 Gbps in each direction. The PCB 210 is used as a male electrical connector with leads 208 mating the female connector 212 located in customer application. In FIG. 3e, the leads-top side 208a and leads-bottom side 208b are seen. PCB 210 may have an optical sub-assembly mounted thereon, such as optical sub-assembly 300 or optical sub-assembly 300 with heat sink carrier 320.

The optional rear section of the device of FIG. 4 is illustrated to be a male connector.

The optical device in accordance with the teachings of this invention is configured to be mounted in a variety of host systems, for example, routers, computers, switches, bridges, and I/O cards. Also, the cable assembly in accordance with the teachings of this invention may be used in any application requiring an interface between electrical and optical signals. Further, in other embodiments, the substrate need not be PCB, but could equally be any suitable substrate such as a printed wiring board (PWB) and/or similar substrates well known in the art. The cable assembly in accordance with the teachings of this invention particularly well-suited for optical transponders, optical transceivers, or the like; the teachings of the present application are not limited to any particular type of optoelectronic device.

It will be understood that although it is described that the electrical connector on the PCBs in accordance with the teachings of this invention are ale electrical connectors for the example embodiments, alternatives are possible within the teachings of this invention. For example, each PCB may have plated holes that can transmit electrical signals while the host board could have pins, then it could be considered that the connector on the PCB is a female electrical connector.

Numerous modifications may be made without departing from the spirit and scope of the invention as defined in the appended claims.

What is claimed is:

1. An optical device, comprising:
   a substrate interface board;
   a heat sink carrier having guide pins thereon, the guide pins being integral to the heat sink carrier;
   an optical sub-assembly passively aligned to the heat sink carrier via the guide pins;
   an electrical connector mounted to the substrate interface board, the electrical connector adapted to mate with a corresponding connector on a host board to provide a connection with the host board;
   an external carrier in which the substrate interface board, heat sink carrier and optical sub-assembly are mounted, wherein the guide pins also permit passive alignment between the heat sink carrier with optical sub-assembly to the substrate interface board; and
   a flexible joint between the heat sink carrier and the external carrier to alleviate mechanical stress on the optical device when the electrical connector mates with the connector on the host board, the size of the flexible joint being dependent on thermal conductivity of the flexible joint.

2. The optical device of claim 1, wherein the flexible joint comprises a thermally conductive non-rigid substance.

3. The optical device of claim 2, wherein the flexible joint is made of a compliant thermally conductive pad.

4. The optical device of claim 1, wherein the substrate interface board is a printed circuit board.

5. The optical device of claim 1, wherein the device is an optical transmitting and/or receiving device.

6. The optical device of claim 1, wherein the host board is part of a router.

7. The optical device of claim 1, wherein the electrical connector mounted to the interface board is a male electrical connector and the corresponding connector on the host board is a female electrical connector.

8. The optical device of claim 1, wherein the external carrier serves as a secondary heat sink.

9. The optical device of claim 1, wherein the size of the flexible joint is 12×8 millimeters.

10. An optical device, comprising:
    a printed circuit board having an optical floating sub-assembly thereon; and
    a thermally conductive non rigid substance on the optical floating sub-assembly to dissipate heat between a heat sink carrier and an external carrier of the optical device, the non rigid substance alleviating mechanical stress on the optical floating sub-assembly when connected to a host board, the size of the non rigid substance being dependent on thermal conductivity of the non rigid substance, wherein the heat sink carrier comprises mechanical features that are integral to the heat sink carrier such that the optical sub-assembly is configured for passive alignment to the heat sink carrier and to the printed circuit board.

11. The optical device of claim 10, wherein the mechanical features are guide pins.

12. The optical device of claim 11, wherein the non rigid substance is a flexible joint between the heat sink and external carrier to absorb mechanical stress when the printed circuit board mates with a host board.

13. The optical device of claim 10, wherein the external carrier serves as a secondary heat sink.

14. The optical device of claim 10, wherein the size of the non rigid substance is 12×8 millimeters.

15. An optical device, comprising:
    an optical subassembly having at least an optical lens and an optical die;
    a heat sink carrier with guide pins that are integral to the heat sink carrier;
    a printed circuit board to which the combined heat sink carrier and optical subassembly are mounted, wherein the guide pins facilitate passive alignment thereof;
    an electrical connector mounted to the substrate interface board, the electrical connector adapted to mate with a corresponding connector on a host board to provide a connection with the host board;
    an external carrier for receiving the assembled printed circuit board, heat sink carrier and optical subassembly, wherein the heat sink carrier dissipates heat from the floating optical subassembly to the external carrier; and
    a flexible joint between the heat sink carrier and the external carrier to alleviate mechanical stress on the optical device when the electrical connector mates with the connector on the host board, the size of the flexible joint being dependent on thermal conductivity of the flexible joint,
    wherein the optical subassembly is configured for passive alignment to the heat sink carrier via the guide pins.

16. The optical device of claim 15, wherein the external carrier serves as a secondary heat sink.

17. The optical device of claim 15, wherein the size of the flexible joint is 12×8 millimeters.

\* \* \* \* \*